UNITED STATES PATENT OFFICE.

N. CHAPMAN MITCHELL, OF PHILADELPHIA, PENNSYLVANIA.

RECOVERING RUBBER FROM WASTE.

SPECIFICATION forming part of Letters Patent No. 300,720, dated June 17, 1884.

Application filed May 5, 1881. (No specimens.)

*To all whom it may concern:*

Be it known that I, N. CHAPMAN MITCHELL, a citizen of the United States, and a resident of Philadelphia, Pennsylvania, have invented certain Improvements in Recovering Rubber from Rubber Waste, of which the following is a specification.

The object of my invention is to effect the thorough and economical removal of fibrous matter from rubber waste.

In the manufacture of many articles—such as wearing-apparel, overshoes, belting, hose, packing, &c.—rubber or the compound of which rubber forms a part is usually combined with fibrous or textile material—such as woolen or cotton cloth—the rubber or rubber compound being generally applied to the cloth in the form of a coating, and the rubber being sometimes raw or sun-cured and sometimes vulcanized. Many attempts have heretofore been made to recover the rubber or rubber compound from the scraps or cuttings resulting from the manufacture of rubber goods, or from the goods themselves after they have become so worn as to be no longer available for the purposes for which they were intended. Among the plans hitherto proposed may be mentioned the subjecting of the scraps or waste to the action of boiling water or steam, or to heated solutions of caustic alkali or diluted sulphuric acid; but all of these processes have been so far from practical that the waste is generally considered valueless. I have ascertained that the rubber in the waste will effectually resist the action of strong sulphuric or muriatic acid heated to a high temperature, but that the textile material will yield to the corrosive influence of the acid, the zinc and whiting with which the rubber is usually combined also yielding to the acid, thus leaving the rubber in the condition of a practically pure and marketable article. The removal of the zinc and whiting, however, forms no part of my present invention, as it has been made the subject of a separate application for a patent.

In carrying out my invention the acid is first deposited in the bottom of a tank or vat, into which the waste is then introduced, and the tank or vat closed. The acid is then heated by means of a steam-coil, steam-jacket, or in some other suitable manner, steam at a pressure of from fifty (50) to seventy-five (75) pounds being used, so as to impart a high degree of heat to the acid. It is desirable that the rubber waste to be treated should, before being subjected to the acid, be separated by cutting or grinding into comparatively small pieces, so as to expedite and facilitate the action of the acid upon the mass. The treatment is continued for from one to five hours, in accordance with the character of the material; and the thick pasty mass which results from the treatment is then removed from the tank and subjected to the action of a washing-machine, the effect of which is to separate and carry off the sulphuric acid and impurities, leaving the rubber in a pure or almost pure condition. The recovered rubber is subsequently dried and passed between rolls or mullers, whereby it is kneaded into a compact homogeneous mass, ready for the market.

The strength of the acid and the quantity employed in respect to the quantity of material treated will depend upon the proportion of fiber and impurities in the waste. In practice I have used acid of a strength of 66° Baumé, employing for every one thousand pounds of waste from three hundred to five hundred pounds of sulphuric acid or from four hundred to seven hundred and fifty pounds of muriatic acid. When the rubber is combined with woolen fabric having long fibers of extra strength, I sometimes add to the sulphuric or muriatic acid about one-twentieth part of its weight of fluoric acid, to facilitate the operation. The action of the heated acid is to entirely eliminate and destroy the fibrous portions of the waste. When the rubber contains but about one or two per cent. of sulphur, the latter will be eliminated by the treatment above set forth; but when a large percentage of sulphur is present the rubber retains its vulcanized character.

My invention is distinct from the plan which has been proposed of treating the waste with exceedingly-diluted acid—such, for instance, as that described in Hayward's patent, No. 40,407, dated October 27, 1863. Such dilute acid can have no appreciable effect in the way of destroying the fiber. Neither do I claim the subjecting of rubber waste to the action of sulphuric acid of sufficient strength to destroy fibrous matter contained in the waste, that being described in the French patent of Faure, No. 91,665, April 3, 1871. Sulphuric acid, however, if employed at ordinary temperatures, or at any of the temperatures set forth or suggested by Faure, acts injuriously upon the rubber; and my invention, as hereinbefore stated, is based upon the discovery that the rubber in the waste will effectually resist the action of strong sulphuric or muriatic acid heated to a high temperature.

I claim as my invention—

1. As an improvement in the art of treating rubber waste for the recovery of the rubber therefrom, boiling said waste in sulphuric or muriatic acid of a strength sufficient to eliminate and destroy the fibrous material with which the waste is combined, substantially as set forth.

2. The within-described process of eliminating woolen fiber from rubber waste containing the same, said mode consisting in boiling the waste in sulphuric, muriatic, or equivalent acid of sufficient strength to eliminate said woolen fibers, as set forth.

3. As an improvement in the art of treating rubber waste for the recovery of rubber therefrom, the process herein described, said process consisting in first boiling the waste in strong sulphuric or muriatic acid, and then washing the mass resulting from the acid treatment, all substantially as set forth.

In testimony whereof I have signed my name to this specification in the presence of two subscribing witnesses.

N. CHAPMAN MITCHELL.

Witnesses:
ARMER F. McCORMICK,
HARRY SMITH.